UNITED STATES PATENT OFFICE.

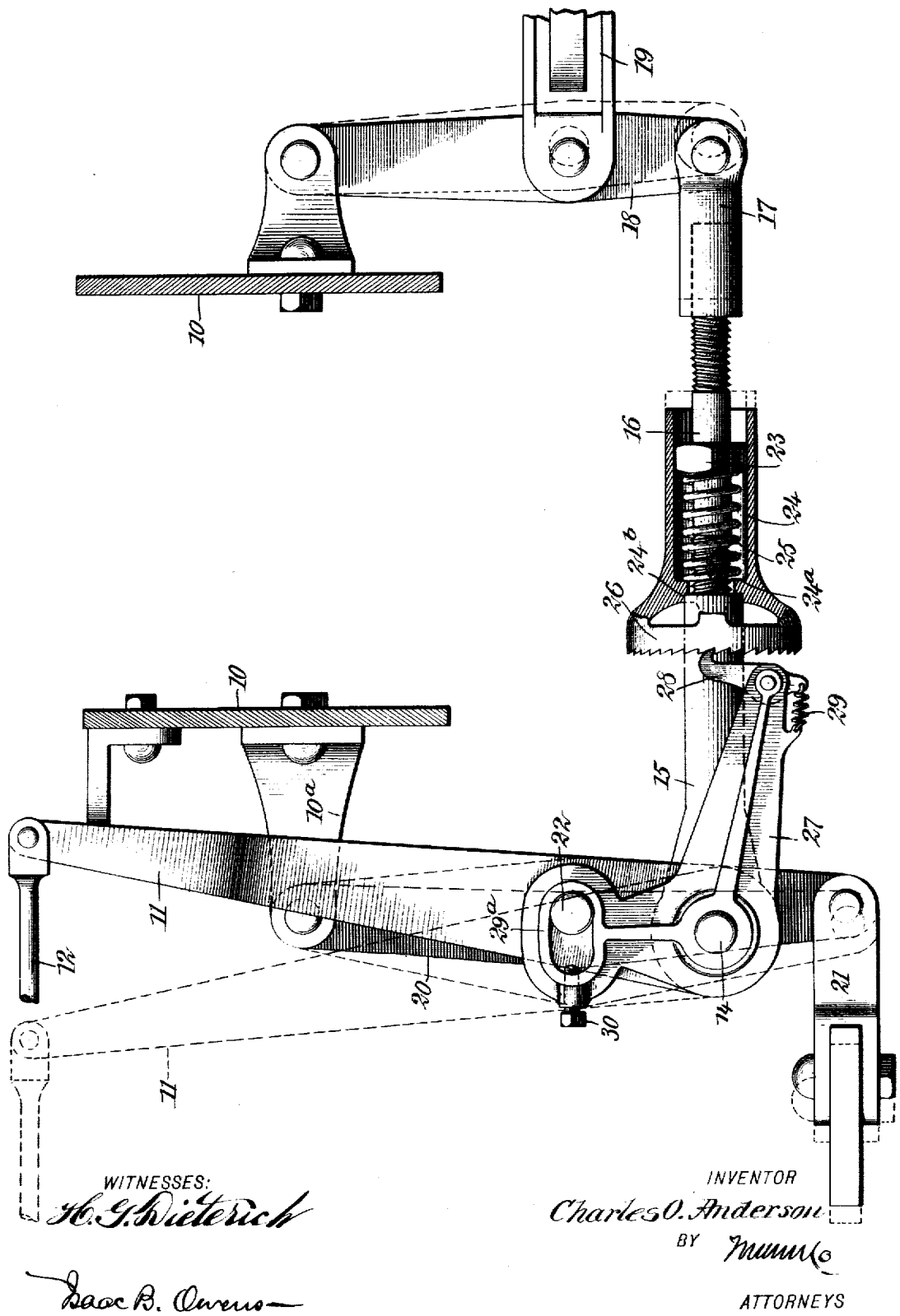

CHARLES OSCAR ANDERSON, OF OMAHA, NEBRASKA, ASSIGNOR OF ONE-HALF TO A. T. AUSTIN, OF OMAHA, NEBRASKA.

SLACK-ADJUSTER.

No. 823,095. Specification of Letters Patent. Patented June 12, 1906.

Application filed August 26, 1905. Serial No. 275,884.

*To all whom it may concern:*

Be it known that I, CHARLES OSCAR ANDERSON, a citizen of the United States, and a resident of Omaha, in the county of Douglas and State of Nebraska, have invented a new and Improved Slack-Adjuster, of which the following is a full, clear, and exact description.

The invention relates to a means for automatically taking up slack which may occur in the brake-rigging of railway-cars, due to wear on the brake-shoes or other parts.

The invention resides in certain special features of construction and combinations of parts, which will be fully set forth in the specification, and pointed out in the claims.

Reference is had to the accompanying drawing, which represents a side elevation of the invention in practical adjustment.

10 indicates a part of the framing of the car to which the invention is applied. For instance, 10 may be taken to indicate the bolster-bar of a modern street-car truck. 11 indicates the main brake-lever, which is connected through a rod 12 with means for operating the brake, which may be either manual or automatic, as desired. Said lever is pivoted by a pin 14 to an internally-threaded bar 15, in which operates one end of a right and left hand threaded screw 16. The other end of the said screw operates in an internally-threaded sleeve or bar 17, which is pivoted to a lever 18. Said lever is fulcrumed on the truck and has a connection 19 with one of the brake-beams. A third brake-lever 20 is hung from a bracket 10ª on the bolster 10 and carries at its lower end a suitable connection 21, extending to the second brake-beam of the truck. The levers 11 and 20 are connected by a pivot-pin 22, which projects laterally beyond the lever 11 for the purpose which will hereinafter fully appear. Now it is clear that by exerting a tension on the lever 11, so as to throw the same in the position indicated by the broken lines in the drawing, the levers 18 and 20 will be swung apart from each other to apply the brakes.

The right and left hand threaded screw 16 has an angular portion 23 formed on or secured to the same, and this is received in a correspondingly-formed sleeve 24, the sleeve engaging the angular portion, so that the screw is forced to turn with the sleeve. 25 indicates a spring encircling the screw and bearing between the enlarged portion 23 and an interior shoulder 24ª, formed at one end of the sleeve 24, this spring serving to press the sleeve snugly up against the tubular bar or member 15, as the drawing shows. The sleeve is provided with an annular groove 24ᵇ, receiving the end of said bar 15 and forming a bearing around which the sleeve may freely turn. At the end of the sleeve having said bearing a ratchet 26 is arranged. This ratchet is preferably formed integral with the sleeve, although any other construction may be resorted to which will firmly connect the sleeve and ratchet. Mounted to swing around the center of the pin 14 is an elbow-lever 27, one arm of which carries a pivoted dog 28, which has a spring 29 holding the dog yieldingly engaged with the ratchet 26, as shown. The other arm of the elbow-lever 27 is formed with a loop or yoke 29ª thereon, and this loosely receives the before-referred-to projecting end of the pin 22. The left-hand end of said loop or yoke 29ª is provided with a set-screw 30, which operates in the loop and which may be adjusted at will.

In the operation of the device, assuming that the brake-rigging has been set up taut for the first operation, the screw 30 should be adjusted so that when the lever 11 is thrown over to apply the brakes and reaches its extreme position said screw will be barely engaged by the lever. After continuous use the brake-shoes will wear down on their surfaces, and the brake-rigging will thus become slack, requiring that the lever 11 may be thrown over farther in order effectually to apply the brakes. When this is done, the screw 30 is engaged by the pin 22 and the lever 27 rocks around the pin 14, thus causing the dog 28 to ride up on the ratchet 26 and engage the same in a new position. Then when the lever 11 is allowed to return upon the release of the brakes, since the elbow-lever 27 is in a new position, the pin 22 will strike the right-hand end of the loop 29ª and throw the lever back, thus imparting a turning movement to the sleeve which is transmitted to the screw 16, and said screw is turned into the threaded members 15 and 17, thus spreading them apart and lengthening the distance between the same. This will take up the slack in the rigging and allow the brakes to be applied without imparting to the lever 11 a more than ordinary stroke. It will thus be seen that the device operates automatically, and each time that the brake-rigging slacks the screw 16 will be turned to tauten the connections. It will also be observed that this operation of the screw is not brought about when the rigging is under tension, but only after the brakes have been released and the pressure on the rigging is relaxed. The apparatus may be used on either hand or power brakes and will not interfere with the employment of the usual manually-operated slack adjustment.

Having thus described the preferred form of my invention, what I claim as new, and desire to secure by Letters Patent, is—

1. In a slack-adjuster, the combination of two internally-threaded brake-rigging members, a right and left hand threaded screw engaged in the same, a sleeve slidably mounted on the screw and engaged therewith, a ratchet in connection with the sleeve, a pawl coacting with the ratchet, and means actuated by a part of the brake-rigging for driving the pawl.

2. In a slack-adjuster the combination with parts of a brake-rigging, of an adjustable connection between the same, means for operating said connection including a ratchet, a pawl coacting with the ratchet, and an elbow-lever carrying the pawl, the elbow-lever having a yoke loosely receiving a part on the swinging member of the brake-rigging, for the purpose specified.

3. In a slack-adjuster, the combination with parts of a brake-rigging, of an adjustable connection between the same, means for operating said connection including a ratchet, a pawl coacting with the ratchet, an elbow-lever carrying the pawl, the elbow-lever having a yoke loosely receiving a part on the swinging member of the brake-rigging, for the purpose specified, and an adjustment-screw arranged in said yoke.

4. In a brake-rigging the combination of a means in connection with a brake-beam, a lever, an adjustable connection joined to said means and said lever, a second lever, a means connecting the second lever with a second brake-beam, a pivot between the two levers, and devices for adjusting the said adjustable connection which devices include a lever, the fulcrum of which is coincident to the joint between the first lever and said adjustable connection.

5. In a brake-rigging the combination of a means in connection with a brake-beam, a lever, an adjustable connection joined to said means and to said lever, a second lever, a means connecting the second lever with a second brake-beam, a pivot between the two levers, and devices for adjusting the said adjustable connection, which devices include an elbow-lever, the fulcrum of which is coincident to the joint between the first lever and said adjustable connection.

6. In a brake-rigging the combination of a means in connection with a brake-beam, a lever, an adjustable connection joined to said means and to said lever, a second lever, a means connecting the second lever with a second brake-beam, a pivot between the two levers, and devices for adjusting the said adjustable connection, which devices include a lever, the fulcrum of which is coincident to the joint between the first lever and said adjustable connection, and a pin coincident to the pivot connecting the two levers the pin being connected with one end of the last-named lever to have limited movement independently thereof.

7. In a brake-rigging the combination of a lever, a means in connection with a brake-beam, an adjustable connection pivoted to the lever and said means, a second lever, a second means in connection with a brake-beam to which the second lever is connected, a pivot joining the two levers and means for adjusting said adjustable connection which means include a lever having its fulcrum coincident to the pivot between the first lever and said adjustable connection.

8. In a brake-rigging the combination of a lever, a means in connection with a brake-beam, an adjustable connection pivoted to the lever and said means, a second lever, a second means in connection with a brake-beam to which the second lever is connected, a pivot joining the two levers and means for adjusting said adjustable connection which means include a lever having its fulcrum coincident to the pivot between the first lever and said adjustable connection, and devices actuated by excessive movement of the first named lever for operating the last-named lever.

9. In a brake-rigging the combination of a lever, a means in connection with a brake-beam, an adjustable connection pivoted to the lever and said means, a second lever, a second means in connection with a brake-beam to which the second lever is connected, a pivot joining the two levers means for adjusting said adjustable connection which means include a lever having its fulcrum coincident to the pivot between the first lever and said adjustable connection, and a pin coincident to the pivot between the two first-named levers, said pin having connection with one end of the third lever and such connection allowing the pin limited independent movement for the purpose specified.

10. In a brake-rigging the combination of a lever, a second lever, a pivot connecting the two, a means in connection with a brake-beam, an adjustable connection between the first-named lever and said means, a means in connection with a second brake-beam and connected to the second lever, devices for adjusting said adjustable connection, a lever for actuating said devices, and means for operating the third lever by the movement of the first two levers.

11. In a brake-rigging the combination of a lever, a second lever, a pivot connecting the two, a means in connection with a brake-beam, an adjustable connection between the first-named lever and said means, a means in connection with a second brake-beam and connected to the second lever, devices for adjusting said adjustable connection, a lever for actuating said devices, and means for operating the third lever by the movement of the first two levers, the third lever having its fulcrum coincident to the point of connection between the first lever and the said adjustable connection.

12. In a brake-rigging the combination of a lever, a means connected to a brake-beam, an adjustable connection between said means and said lever, a second lever pivoted to the first lever, a second means connected to a brake-beam and to the second lever, a means for adjusting the said adjustable connection, and an elbow-lever for operating the last-named means, the elbow-lever being fulcrumed coincident to the connection between the first-named lever and the said adjustable connection and engaged with limited independent movement by the pivot between the two first-named levers.

13. In a brake-rigging the combination with two members thereof, of a screw adjustably connecting them, a sleeve arranged to slide on the screw, the screw turning with the sleeve, a spring-bearing between the sleeve and a part of the screw for the purpose specified, and a means for turning the sleeve.

In testimony whereof I have signed my name to this specification in the presence of two subscribing witnesses.

CHARLES OSCAR ANDERSON.

Witnesses:
FRANK CHRISTMANN,
JOHN HULTGREN.